United States Patent [19]
Codo

[11] 3,806,085
[45] Apr. 23, 1974

[54] DRAIN VALVE AND HOSE FOR DRAINING OIL RESERVOIRS

[75] Inventor: Edward A. Codo, Joliet, Ill.

[73] Assignee: Caterpillar Tractor Co., Peoria, Ill.

[22] Filed: Mar. 29, 1973

[21] Appl. No.: 345,951

[52] U.S. Cl............ 251/144, 251/351, 137/351, 184/1.5
[51] Int. Cl............ F16n 1/00, F16k 31/50
[58] Field of Search........ 251/149.9, 144, 351, 352, 251/353, 216; 285/332.1; 184/1.5, 106; 137/351

[56] References Cited
UNITED STATES PATENTS

| | | | |
|---|---|---|---|
| 3,719,345 | 3/1973 | Bridegum | 251/351 |
| 3,727,638 | 4/1973 | Zaremba, Jr. et al. | 184/1.5 X |
| 2,983,385 | 5/1961 | Botstiber | 137/329.06 X |
| 2,667,760 | 2/1954 | Curtis | 285/332.1 X |
| 3,601,358 | 8/1971 | Crose | 251/144 |
| 2,591,514 | 4/1952 | Courtot | 251/353 X |
| 3,387,621 | 6/1968 | Schaff | 184/1.5 X |
| 3,606,096 | 9/1971 | Campbell | 251/353 X |

*Primary Examiner*—William R. Cline
*Attorney, Agent, or Firm*—Fryer, Tjensvold, Phillips & Lempio

[57] ABSTRACT

A reservoir has the spool of a normally closed drain valve threadably mounted at an outlet thereof. A lower end of the spool may be coupled to a drain conduit upon opening of the valve for reservoir draining purposes. The spool has passages formed therethrough to communicate oil from the reservoir's outlet to the drain conduit upon such opening.

3 Claims, 2 Drawing Figures

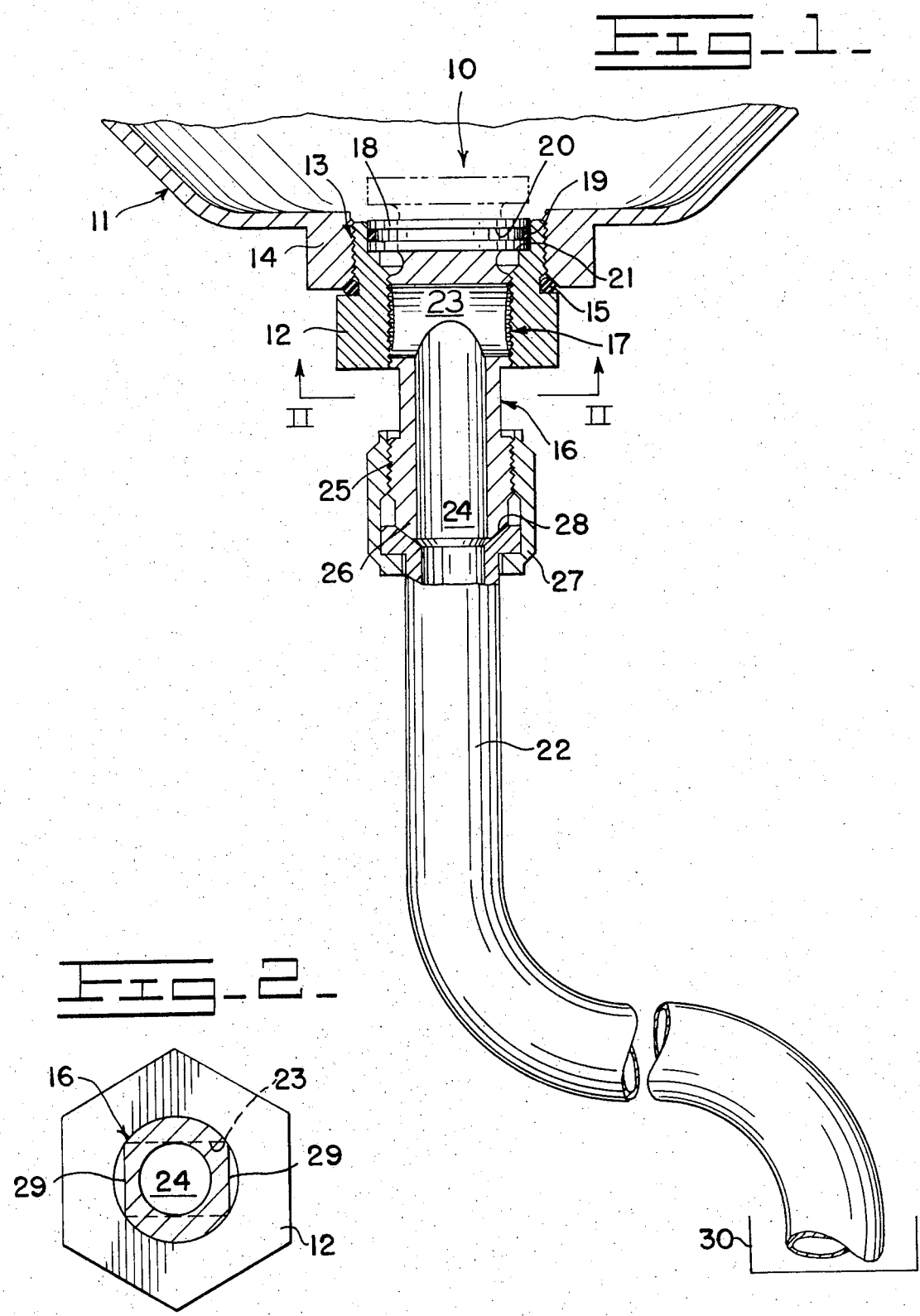

DRAIN VALVE AND HOSE FOR DRAINING OIL RESERVOIRS

BACKGROUND OF THE INVENTION

Conventional drain plugs or valves, adapted for periodically emptying crankcases and other types of oil-containing reservoirs, are normally opened to permit the oil to flow freely into a vessel under the influence of gravity. Such emptied oil tends to splash indiscriminately to thus give rise to cleanup and related problems, particularly when the drain valve is located inconveniently on a vehicle. In current drainage applications wherein a drain hose is attached to the reservoir, the employed drainage systems and operations tend to become somewhat cumbersome and inefficient. Examples of conventional drainage systems are disclosed in U.S. Pat. Nos. 2,353,467; 2,897,966; 3,049,334; 3,097,663 and 3,703,189.

SUMMARY OF THE INVENTION

An object of this invention is to overcome the above, briefly described problems by providing an economical and noncomplex drain valve and method whereby oil can be expeditiously and efficiently drained from a reservoir periodically. The drain valve comprises a spool member threadably mounted at an outlet of the reservoir to be moved axially upon rotation thereof between its closed and opened positions. Annular sealing means, disposed on an upper end of the spool member, forms a seal thereat when the spool is retracted to its closed position. Combined coupling and sealing means are disposed on a lower end of the spool member to selectively couple the spool member to a drain hose. Interconnecting passages are formed through the spool member to communicate the reservoir's outlet with the drain hose upon extension of the spool member to its opened position.

The draining method of this invention comprises the steps of coupling a drain hose in sealing connection to a lower end of the spool member and rotating the drain hose and the spool member simultaneously to open the drain valve.

BRIEF DESCRIPTION OF THE DRAWINGS

Further objects of this invention will beome apparent from the following description and accompanying drawings wherein:

FIG. 1 is a cross sectional view illustrating an openable drain valve of this invention mounted at the outlet of an oil reservoir; and FIG. 2 is a view taken in the direction of arrows II—II in FIG. 1.

DETAILED DESCRIPTION

FIG. 1 illustrates a drain valve 10 detachably mounted at the outlet of a reservoir 11, adapted to contain a hydraulic fluid such as oil. An annular adapter 12 is threadably mounted at 13 on a downwardly extending boss 14 of the reservoir. A conically shaped seat is preferably formed on the boss to engage and compress an O-ring seal 15, mounted between the adapter and the boss.

The drain valve comprises a spool means or member 16 threadably mounted in the adapter at 17. The upper end of the spool member has an annular flange 18 formed thereon to mount sealing means such as an O-ring seal 19 in a circumferential groove 20 thereof. When the drain valve is in its normally retracted, closed position illustrated by full-lines in FIG. 1, the underside of the flange will abut an annular shoulder 21 of adapter 12 to provide cooperating stop means to precisely position the spool member in the adapter.

Passage means are formed in the spool member to communicate hydraulic fluid from reservoir 11 to a drain conduit 22, upon extension of the spool member to its opened position illustrated by phantom lines in FIG. 1. Such passage means comprises a cross-passage 23 formed transversely through the spool member, adjacent to its upper end, and a longitudinal passage 24 which intersects the cross-passage. The lower end of the spool member may be selectively coupled to the drain conduit by combined coupling and sealing means comprising threads 25 and a conically shaped seating end 26 of the spool member.

The threads are adapted to mount an internally threaded and externally hex-headed adapter 27 thereon. Seating end 26 of the spool member is adapted to form a static seal when engaged with a like-shaped seat 28, formed integrally with the drain conduit. Reservoir 11 may comprise an oil pan or other suitable container adapted to retain hydraulic fluid utilized to operate working components of an earthworking vehicle or the like.

In normal vehicle operation, the drain valve would assume its closed, FIG. 1 position, but with drain conduit 22 and adapter 27 removed therefrom. When it is desired to drain the fluid from the reservoir for replenishing purposes, a spanner wrench or the like may be placed over parallel flats 29, formed on the spool member (FIG. 2). The spanner wrench is primarily employed to prevent rotation of the spool member upon coupling of drain conduit 22 thereto.

Adapter 27 may be initially hand-threaded onto threads 25 of the spool member. An open-end wrench may be then placed over the hex-head outer surface of the adapter to rotate it upwardly into its FIG. 1 position. As indicated above, when the adapter is moved fully upwardly on the spool member, conically shaped end 26 of the spool member will engage seat 28 to form a static seal thereat.

Thereafter, the workman can grasp adapter 27 to manually rotate the adapter, drain conduit and spool member as a unit to raise the spool member to its phantom-line, opened position illustrated in FIG. 1. Hydraulic fluid contained in the reservoir will thus flow freely under the influence of gravity through passages 23 and 24 and conduit 22 to collect in a vessel such as pan 30. Upon completion of such drainage, the above enumerated steps may be reversed to close the drain valve whereupon the reservoir may be filled with fresh hydraulic fluid.

What is claimed is:

1. Drain means for a reservoir having an opening with threads disposed therearound, adapter means threadably mounted in said opening and having a passageway extending therethrough, said passageway having threads disposed therearound, spool means threadably mounted in said passageway to be moved axially between a retracted position closing said passageway and an extended position opening the same, cooperating stop means on said spool means and said adapter for precisely positioning said spool means in its closed position, said stop means comprising an annular flange and annular sealing means circumferentially disposed on an upper end of said spool means and an annular shoulder disposed on said adapter for providing a seal between said spool means and said reservoir when said spool means is in its closed position, coupling and sealing means disposed on a lower end of said spool means including an adapter attaching a drain hose thereto, said adapter being threadably mounted on said spool means and securing a conically shaped seating end on said drain hose into engagement with a like shaped seat formed on said spool means to form a static seal thereat, passage means in said spool means comprising a cross-passage formed transversely therethrough and a longitudinal passage intersecting said cross-passage communicating fluid from said reservoir through said spool means and said drain hose when the spool means is extended to open said passageway.

2. The drain valve of claim 1 wherein at least one pair of exposed flats are formed in parallel relationship on said spool means and on said adapter to facilitate placement of a wrench thereon.

3. The drain means of claim 1 wherein the annular flange is disposed beneath the annular sealing means and an additional flange is positioned above the sealing means.

* * * * *